US009704333B2

(12) United States Patent
Joung

(10) Patent No.: US 9,704,333 B2
(45) **Date of Patent: *Jul. 11, 2017**

(54) METHOD OF GAMING, A GAME CONTROLLER AND A GAMING SYSTEM

(71) Applicant: Aristocrat Technologies Australia Pty Limited, North Ryde, NSW (AU)

(72) Inventor: Sek Hwan Joung, Lakemba (AU)

(73) Assignee: Aristocrat Technologies Australia Pty Limited (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/193,834

(22) Filed: Jun. 27, 2016

(65) Prior Publication Data

US 2016/0307393 A1 Oct. 20, 2016

Related U.S. Application Data

(63) Continuation of application No. 13/944,308, filed on Jul. 17, 2013, now Pat. No. 9,378,627, which is a (Continued)

(30) Foreign Application Priority Data

Nov. 9, 2009 (AU) ................................ 2009905471

(51) Int. Cl.

| | |
|---|---|
| ***G06F 17/00*** | (2006.01) |
| ***G07F 17/32*** | (2006.01) |
| ***G07F 17/34*** | (2006.01) |

(52) U.S. Cl.

CPC ...... *G07F 17/3213* (2013.01); *G07F 17/3265* (2013.01); *G07F 17/34* (2013.01)

(58) Field of Classification Search

None

See application file for complete search history.

(56) References Cited

U.S. PATENT DOCUMENTS

| | | | |
|---|---|---|---|
| 6,203,430 | B1 | 3/2001 | Walker et al. |
| 7,137,888 | B2 | 11/2006 | Glavich et al. |

(Continued)

FOREIGN PATENT DOCUMENTS

| | | |
|---|---|---|
| KR | 2009041582 | 4/2009 |
| NZ | 519361 | 3/2004 |

(Continued)

OTHER PUBLICATIONS

International Search Report PCT/US 08/07730 dated Oct. 2, 2008.

*Primary Examiner* — Paul A D'Agostino

(74) *Attorney, Agent, or Firm* — McAndrews, Held & Malloy, Ltd.

(57) ABSTRACT

A method of gaming at a gaming machine. The method includes designating a symbol display position of a plurality of symbol display positions as having a bonus symbol set applying to it for a game round, and selecting and displaying a symbol from the bonus symbol set at the designated symbol display position. The method also includes selecting symbols for display at the other symbol display positions from a base symbol set independently of the selection of the symbol from the bonus symbol set, and evaluating the symbols displayed at the plurality of symbol display positions to determine whether to make an award for the game round.

20 Claims, 7 Drawing Sheets

Related U.S. Application Data continuation of application No. 12/942,166, filed on Nov. 9, 2010, now Pat. No. 8,517,816.

(56) References Cited

U.S. PATENT DOCUMENTS

| | | | | |
|---|---|---|---|---|
| 8,888,597 | B2 * | 11/2014 | Kroeckel ............ | G07F 17/3248<br>463/16 |
| 2006/0058097 | A1 | 3/2006 | Berman et al. | |
| 2006/0068881 | A1 | 3/2006 | Casey | |
| 2006/0281525 | A1 | 12/2006 | Borrisov | |
| 2008/0287178 | A1 | 11/2008 | Berman et al. | |
| 2009/0203435 | A1 * | 8/2009 | Yoshizawa .......... | G07F 17/3248<br>463/27 |

FOREIGN PATENT DOCUMENTS

| | | |
|---|---|---|
| WO | 2008063392 | 5/2008 |
| WO | 2008156846 | 12/2008 |

* cited by examiner 901 902 903

| | | | | |
|---|---|---|---|---|
| PIC1 | Q | SCAT | PIC1 | PIC1 |
| A | PIC1 | WILD | J | J |
| K | J | Q | BONUS | 10 |

911 912 913

| | | | | |
|---|---|---|---|---|
| A | PIC2 | A | 10 | SCAT |
| PIC1 | A | PIC1 | 9 | K |
| Q | 10 | J | WILD | PIC3 |

METHOD OF GAMING, A GAME CONTROLLER AND A GAMING SYSTEM

RELATED APPLICATIONS

This application is a continuation of U.S. patent application Ser. No. 13/944,308, filed Jul. 17, 2013, expected to issue as U.S. Pat. No. 9,378,627 on Jun. 28, 2016, which is a continuation of U.S. patent application Ser. No. 12/942,166 filed Nov. 9, 2010, now issued U.S. Pat. No. 8,517,816, which claims priority to Australian Provisional Application No. 2009905471, having a filing date of Nov. 9, 2009, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The invention relates to a method of gaming, a game controller, and a gaming system.

In some existing gaming system, if a trigger condition is met, a wild symbol which has occurred in one game persists for a subsequent game.

While such gaming systems provide players with enjoyment, a need exists for alternative gaming systems in order to maintain or increase player enjoyment.

BRIEF SUMMARY OF THE INVENTION

In a first aspect, the invention provides a method of gaming comprising:

designating a symbol display position of a plurality of symbol display positions as having a bonus symbol set applying to it for a game round;

selecting and displaying a symbol from the bonus symbol set at the designated symbol display position;

selecting symbols for display at the other symbol display positions from a base symbol set independently of the selection of the symbol from the bonus symbol set; and evaluating the symbols displayed at the plurality of symbol display positions to determine whether to make an award for the game round.

In an embodiment, the plurality of symbol display positions are arranged in a plurality of columns, each column comprising a plurality of symbol display positions.

In an embodiment, the base symbol set comprises a plurality of symbol subsets corresponding to respective ones of the plurality of columns such that each designated symbol display position corresponds to one of the symbol sets.

In an embodiment, the method comprises designating the symbol position in response to a trigger condition being met as part of a prior game round.

In an embodiment, the prior game round comprises:

selecting symbols for display at each of the plurality of symbol display positions from the base symbol set; and evaluating the symbols displayed at the plurality of symbol display positions to determine whether the trigger condition is met.

In an embodiment, the trigger condition is that the displayed symbols include a designated minimum number of scatter symbols.

In an embodiment, the position of the designated symbol display position is predetermined.

In an embodiment, the method comprises selecting the position of the designated symbol display position at random.

In an embodiment, the game round is one of a series of game rounds in which a symbol is selected for display at a designated symbol display position.

In an embodiment, the designated symbol display position is different in different ones of the game rounds.

In an embodiment, the method comprises moving the designated symbol display position between symbol display positions in accordance with a designated pattern of movement.

In an embodiment, the method comprises moving the designated symbol display position between symbol display positions in accordance with a random displacement relative to a prior designated symbol display position.

In an embodiment, the method comprises selecting the designated symbol display position at random for at least one subsequent game round of the series of game rounds.

In an embodiment, the method comprises ending the series of game rounds when an end condition is met.

In an embodiment, the end condition is based on an evaluation of the selected symbols of a game round.

In an embodiment, the method comprises selecting symbols for a plurality of designated symbol positions at which.

In an embodiment, the method comprises selecting symbols for each designated symbol position independently from the bonus symbol set.

In an embodiment, the method comprises selecting symbols for each designated symbol position independently from different bonus symbol sets.

In an embodiment, there is initially a single designated symbol position and the method comprises adding one or more additional designated symbol positions in response to a position adding condition being met.

In an embodiment, the position adding condition is that a designated outcome has occurred in a prior game round.

In an embodiment, the bonus symbol set comprises at least one function symbol.

In an embodiment, the function symbol is a wild symbol which substitutes for other symbols.

In an embodiment, the bonus symbol set includes at least one symbol which can be used to form the highest available winning symbol combination.

In an embodiment, each of the symbol display positions is associated with one of a plurality of spinning reels.

In an embodiment, there are five spinning reels.

In a second aspect, the invention provides a game controller for a gaming system, the game controller comprising:

a symbol position designator arranged to designate a symbol display position of a plurality of symbol display positions as having a bonus symbol set applying to it for a game round;

a bonus symbol selector arranged to select a symbol from the bonus symbol set for display at the designated symbol display position;

a base symbol selector arranged to select symbols for display at the other symbol display positions from a base symbol set independently of the selection of the symbol from the bonus symbol set; and an outcome evaluator arranged to evaluate the symbols displayed at the plurality of symbol display positions to determine whether to make an award for the game round.

In an embodiment, the symbol display positions are arranged in a plurality of columns, each column comprising a plurality of symbol display positions and the base symbol set comprises a plurality of symbol subsets corresponding to respective ones of a plurality of columns such that each designated symbol display position corresponds to one of the symbol sets.

In an embodiment, the symbol position designator designates the symbol position in response to a trigger condition being met as part of a prior game round.

In an embodiment, the prior game round comprises:

the base symbol selector selecting symbols for display at each of the plurality of symbol display positions from the base symbol set; and the outcome evaluator evaluating the symbols displayed at the plurality of symbol display positions to determine whether the trigger condition is met.

In an embodiment, the trigger condition is that the displayed symbols include a designated minimum number of scatter symbols.

In an embodiment, the position of the designated symbol display position is predetermined.

In an embodiment, the symbol position designator comprising selecting the position of the designated symbol display position at random.

In an embodiment, the game round is one of a series of game rounds conducted by the game controller in which a symbol is selected by the bonus symbol selector from a bonus symbols set for display at a designated symbol display position.

In an embodiment, the symbol position designator designates a different symbol display position in different ones of the game rounds.

In an embodiment, the symbol position designator moves the designated symbol display position between symbol display positions in accordance with a designated pattern of movement.

In an embodiment, the symbol position designator moves the designated symbol display position between symbol display positions in accordance with a random displacement relative to a prior designated symbol display position.

In an embodiment, the symbol position designator selects the designated symbol display position at random for at least one subsequent game round of the series of game rounds.

In an embodiment, the game controller is further arranged to end the series of game rounds upon an end condition being met.

In an embodiment, the end condition is based on an evaluation of the selected symbols of a game round.

In an embodiment, the bonus symbol selector is arranged to select symbols for a plurality of designated symbol positions.

In an embodiment, the bonus symbol selector selects symbols for each designated symbol position independently from the bonus symbol set.

In an embodiment, there are a plurality of symbol sets and the bonus symbol selector selects symbols for each designated symbol position independently from different ones of the plurality bonus symbol sets.

In an embodiment, there is initially a single designated symbol position and the game controller adds one or more additional designated symbol positions in response to a position adding condition being met.

In an embodiment, the position adding condition is that a designated outcome has occurred in a prior game round.

In an embodiment, the bonus symbol set comprises at least one function symbol.

In an embodiment, the function symbol is a wild symbol which substitutes for other symbols.

In an embodiment, the bonus symbol set includes at least one symbol which can be used to form the highest available winning symbol combination.

In an embodiment, each of the symbol display positions is associated with one of a plurality of spinning reels.

In an embodiment, the game controller is implemented at least in part by a processor executing program code stored in a memory.

In a third aspect, the invention provides a gaming system comprising:

a display for displaying play of a game;

a game play mechanism for initiating play of the game; and a game controller operably connected to the display and the game play mechanism, and arranged to:

designate a symbol display position of a plurality of symbol display positions as having a bonus symbol set applying to it for a game round;

select and display a symbol from the bonus symbol set at the designated symbol display position;

select symbols for display at the other symbol display positions from a base symbol set independently of the selection of the symbol from the bonus symbol set; and evaluate the symbols displayed at the plurality of symbol display positions to determine whether to make an award for the game round.

In an embodiment, the plurality of symbol display positions are arranged in a plurality of columns on the display, each column comprising a plurality of symbol display positions.

In an embodiment, the base symbol set comprises a plurality of symbol subsets corresponding to respective ones of the plurality of columns such that each designated symbol display position corresponds to one of the symbol sets.

In an embodiment, the game controller is arranged to designate the symbol position in response to a trigger condition being met as part of a prior game round.

In an embodiment, the prior game round comprises the game controller:

selecting symbols for display at each of the plurality of symbol display positions from the base symbol set; and evaluating the symbols displayed at the plurality of symbol display positions to determine whether the trigger condition is met.

In an embodiment, the trigger condition is that the displayed symbols include a designated minimum number of scatter symbols.

In an embodiment, the position of the designated symbol display position is predetermined.

In an embodiment, the game controller is arranged to select the position of the designated symbol display position at random.

In an embodiment, the game round is one of a series of game rounds in which a symbol is selected by the game controller for display at a designated symbol display position.

In an embodiment, the game controller is arranged to select different designated symbol display positions in different ones of the game rounds.

In an embodiment, the game controller is arranged to move the designated symbol display position between symbol display positions in accordance with a designated pattern of movement.

In an embodiment, the game controller is arranged to move the designated symbol display position between symbol display positions in accordance with a random displacement relative to a prior designated symbol display position.

In an embodiment, the game controller is arranged to select the designated symbol display position at random for at least one subsequent game round of the series of game rounds.

In an embodiment, the game controller is arranged to end the series of game rounds when an end condition is met.

In an embodiment, the end condition is based on an evaluation by the game controller of the selected symbols of a game round.

In an embodiment, the game controller is arranged to select symbols for a plurality of designated symbol positions.

In an embodiment, the game controller is arranged to select symbols for each designated symbol position independently from the bonus symbol set.

In an embodiment, there are a plurality of symbol sets and the game controller is arranged to select symbols for each designated symbol position independently from different ones of the plurality bonus symbol sets.

In an embodiment, there is initially a single designated symbol position and the game controller adds one or more additional designated symbol positions in response to a position adding condition being met.

In an embodiment, the position adding condition is that a designated outcome has occurred in a prior game round.

In an embodiment, the bonus symbol set comprises at least one function symbol.

In an embodiment, the function symbol is a wild symbol which substitutes for other symbols.

In an embodiment, the bonus symbol set includes at least one symbol which can be used to form the highest available winning symbol combination.

In an embodiment, each of the symbol display positions is associated with one of a plurality of spinning reels.

In a fourth aspect, the invention provides an electronic gaming machine comprising:

a cabinet;

a display mounted to the cabinet a game play mechanism comprising one or more input devices for initiating play of the game mounted to the cabinet; and a game controller disposed within the cabinet, the game controller operably connected to the display and the game play mechanism, the game controller comprising a processor which executes program code stored in a memory such that the game controller:

designates a symbol display position of a plurality of symbol display positions as having a bonus symbol set applying to it for a game round;

selects and displays a symbol from the bonus symbol set at the designated symbol display position;

selects symbols for display at the other symbol display positions from a base symbol set independently of the selection of the symbol from the bonus symbol set; and evaluates the symbols displayed at the plurality of symbol display positions to determine whether to make an award for the game round.

In a fifth aspect, the invention provides computer program code which when executed implements the above method.

In a sixth aspect, the invention provides a tangible computer readable medium comprising the above program code.

In a seventh aspect, the invention provides a data signal comprising the above program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
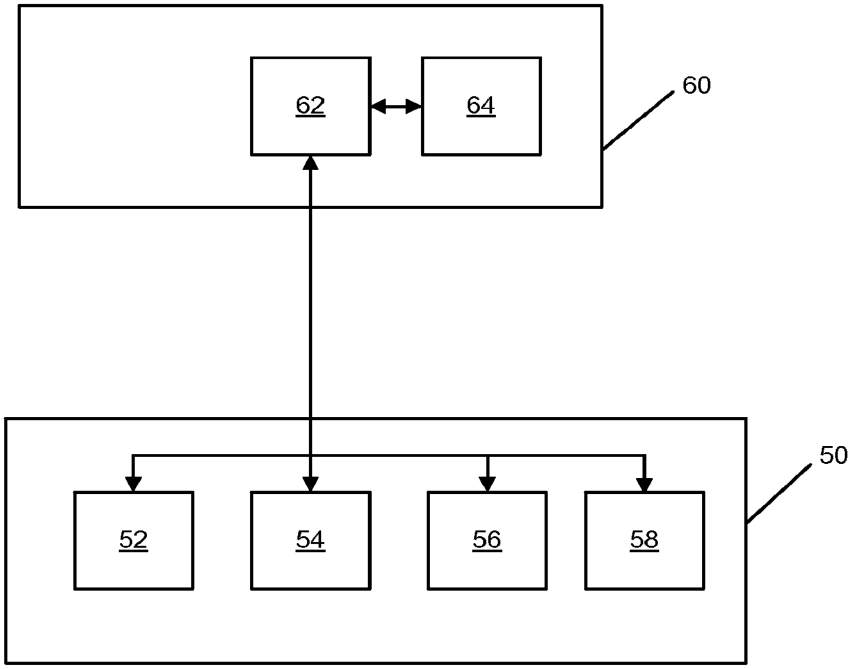
FIG. 1 is a block diagram of the core components of a gaming system.

Referring to the drawings, there is shown a gaming system having a game controller arranged to implement a game with a sticky bonus symbol set, such as a bonus reel. In the embodiment, when a bonus reel is activated it persists for at least one game round. The bonus reel, replaces a designated one of the symbol display positions of a reel. Depending on the embodiment, the bonus reel may move or stay in the same designated position. The bonus reel involves a selection from a bonus symbol set. The symbol set typically comprises high value symbols for the game, for example a function symbols such as a wild symbol and picture symbol which participates in high value awards. In some embodiments, there may be more than one bonus reel may be activated. Advantages relative to known games where a wild symbol persists include that a benefit is provided to the player who receives the wild reel without the exact nature of the benefit being known and more control of the return to player by virtue of the ability to have more than just a wild symbol on the bonus reel.

Persons skilled in the art will appreciate that the bonus reel described in further detail below is the same as a conventional reel in that it can be spun and the symbols are selected based on a stopping position of the bonus reel (from a bonus symbol set which has a defined sequence). The difference is that each bonus reel occupies a single symbol display position.

General Construction of Gaming System

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine.

For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
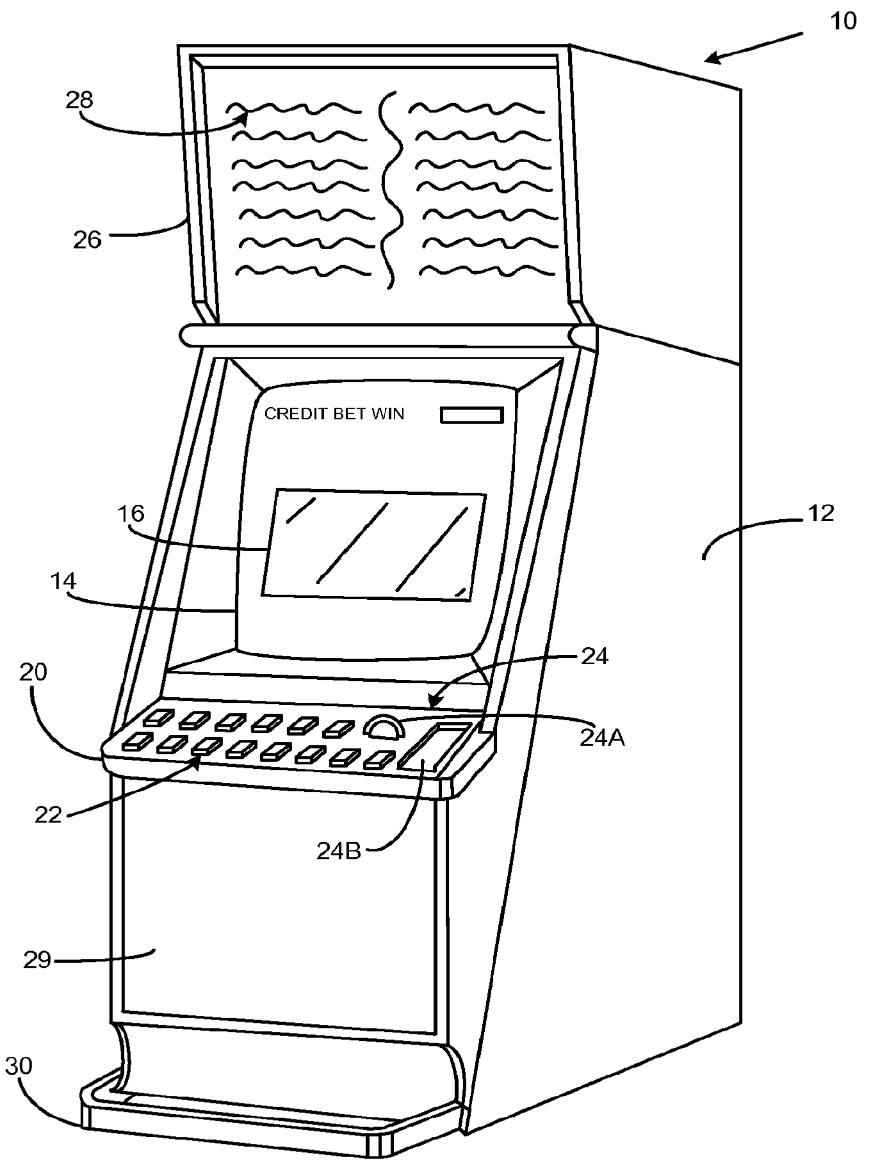
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit. The top box 26 may also include a display, for example a video display unit, which may be of the same type as the display 14, or of a different type.

Figure 3:
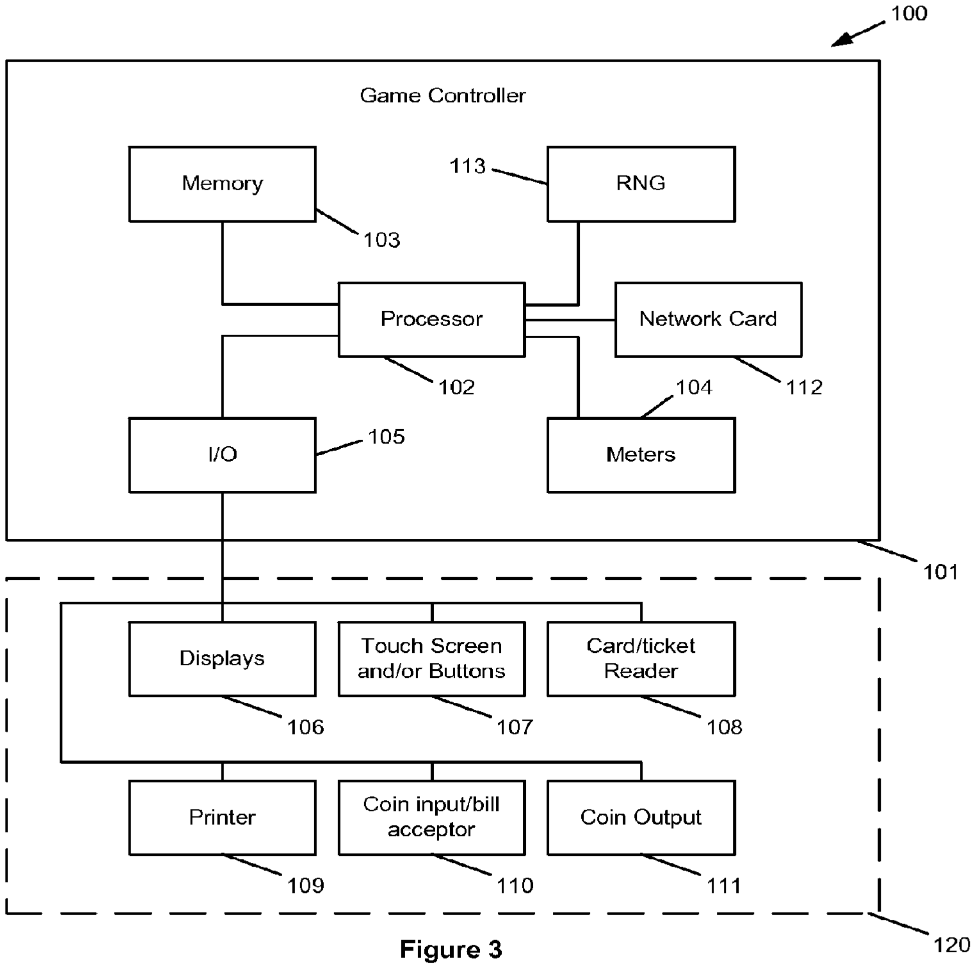
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
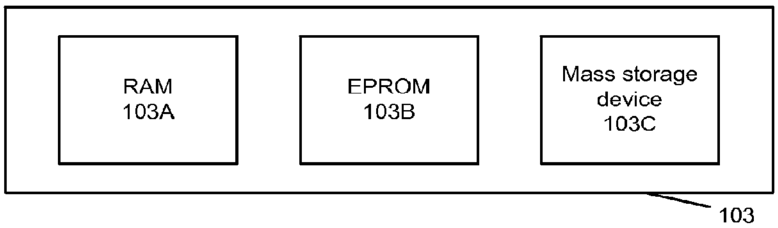
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
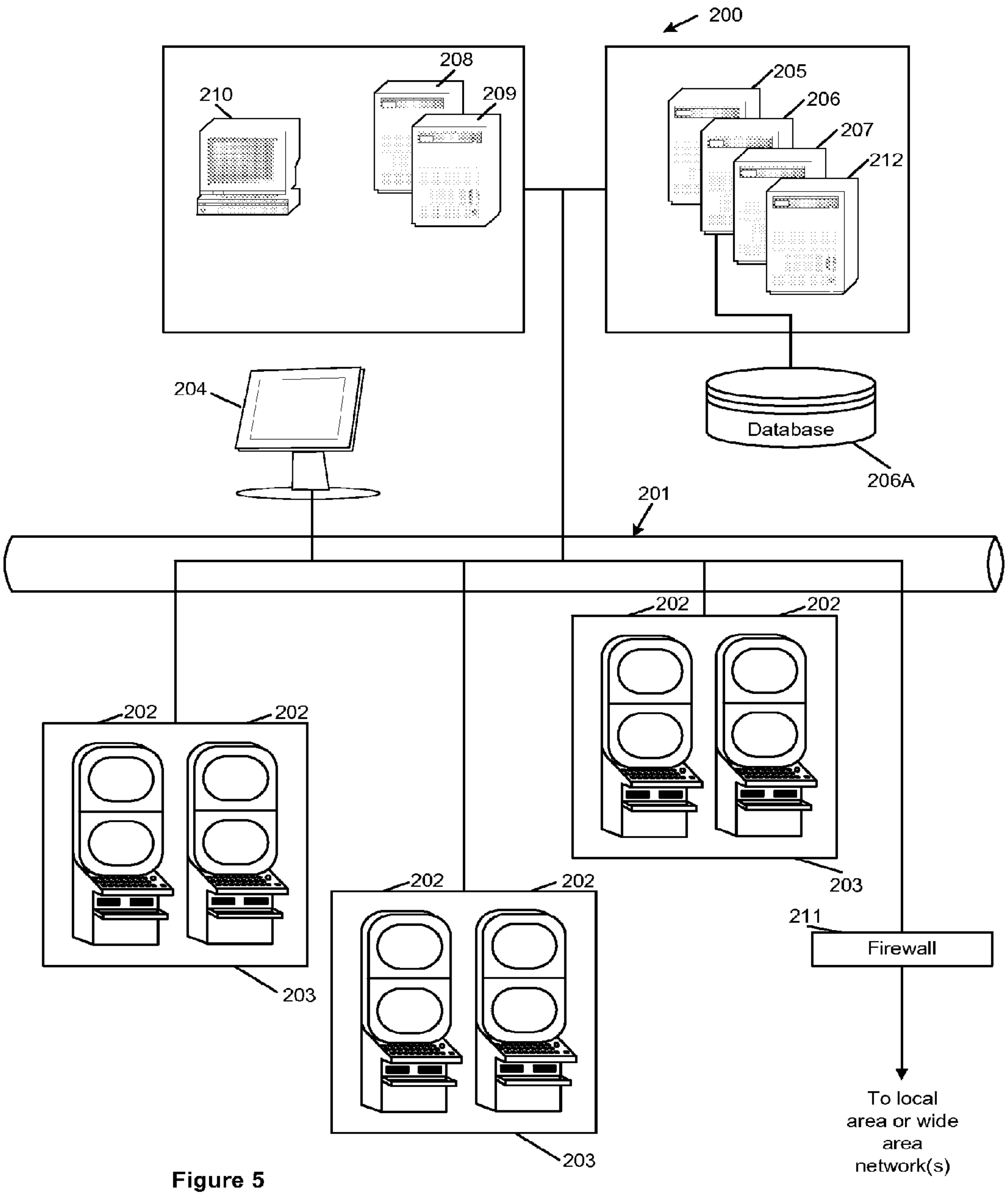
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

The player operates the game play mechanism 56 to specify the win entitlement which will be evaluated for this play of the game and initiates a play of the game. Persons skilled in the art will appreciate that a player's win entitlement will vary from game to game dependent on player selections. In most spinning reel games, it is typical for the player's entitlement to be affected by the amount they wager and selections they make (i.e. the nature of the wager). For example, a player's win entitlement may be based on how many lines they play in each game—e.g. a minimum of one line up to the maximum number of lines allowed by the game (noting that not all permutations of win lines may be available for selection). Such win lines are typically formed by a combination of symbol display positions, one from each reel, the symbol display positions being located relative to one another such that they form a line.

In many games, the player's win entitlement is not strictly limited to the lines they have selected, for example, "scatter" pays are awarded independently of a players selection of pay lines and are an inherent part of the win entitlement.

Persons skilled in the art, will appreciate that in other embodiments, the player may obtain a win entitlement by selecting a number of reels to play. Such games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reels, the active display positions being all display positions of each selected reel and the designated display position of the non-selected reels. As a result for five reels and fifteen display positions there are 243 ways to win.

Figure 6:
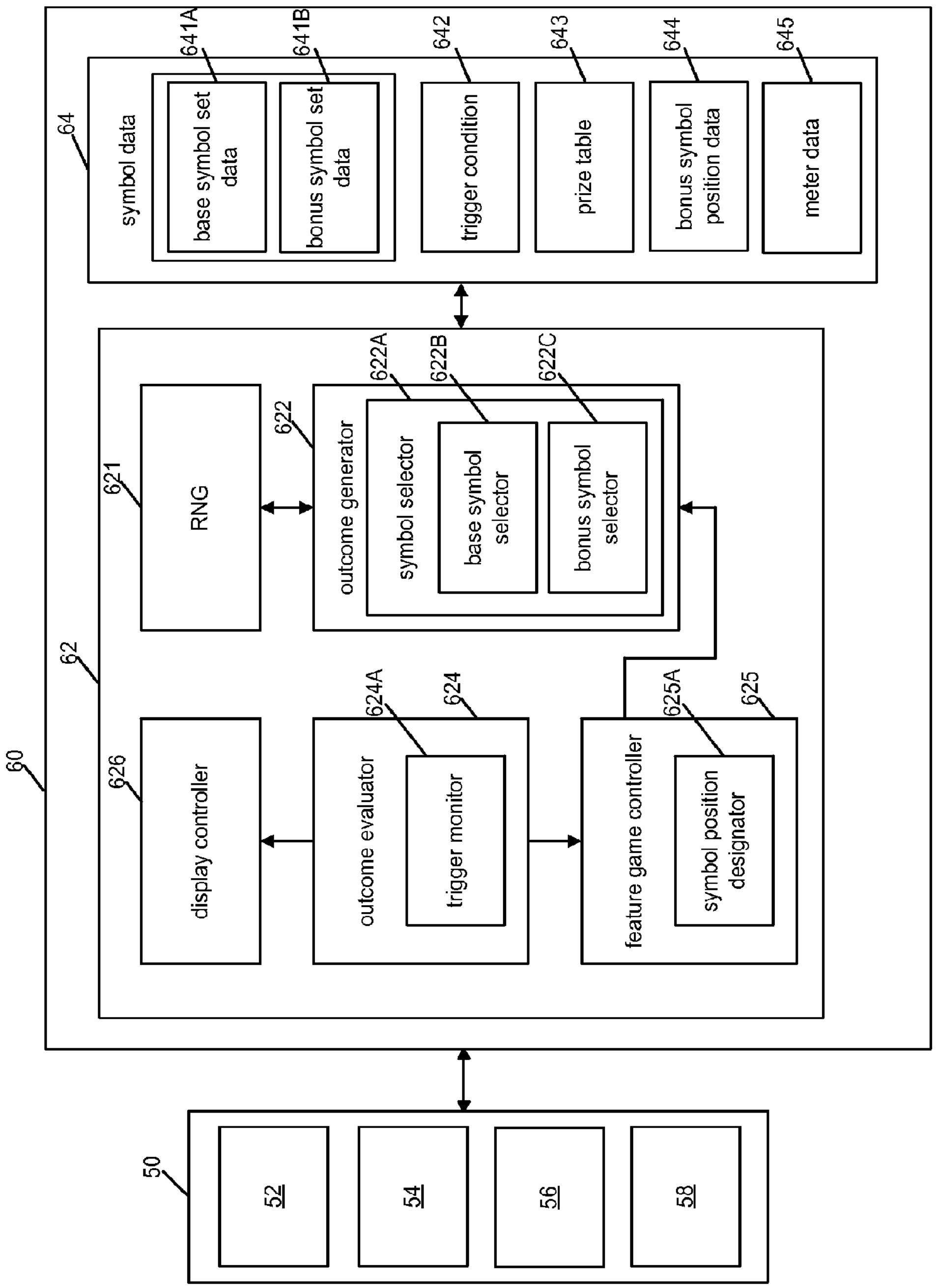
FIG. 6 is a further block diagram of a gaming system.
Figure 7:
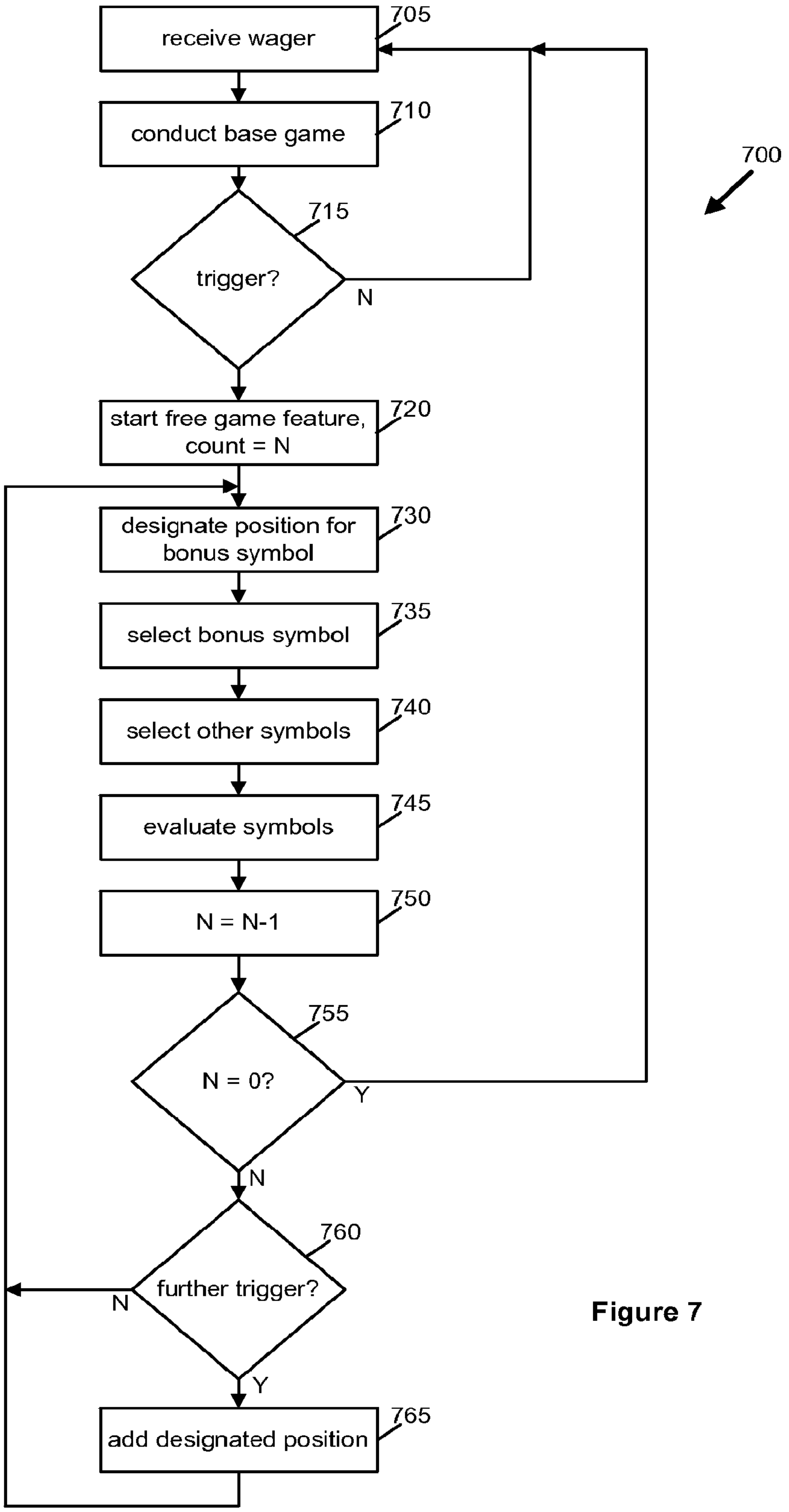
FIG. 7 is a flow chart of an embodiment.

In FIG. 6, the processor 62 of game controller 60 is shown implementing a number of modules based on program code and data stored in memory 64. Persons skilled in the art will appreciate that various of the modules could be implemented in some other way, for example by a dedicated circuit.

These modules include the outcome generator 622 which operates in response to the player's operation of game play mechanism 56 to place a wager and initiate a play of the game and generates a game outcome which will then be evaluated by award evaluator 623. In the base game, the first part of forming the game outcome is for base symbol selector 622B of symbol selector 622A to select symbols from a set of symbols specified by base symbol set data 641A using random number generator 621. The selected symbols are advised to the display controller 624 which causes them to be displayed on display 54 at a set of display positions. The base game is a part of the game which is carried out each time the player makes a wager, typically irrespective of the wager, whereas other parts of the game will only be carried out occasionally for example if a condition is met such as a trigger occurring or if an ante bet is placed (depending on the specific embodiment).

Figures 8, 9A, 9B:
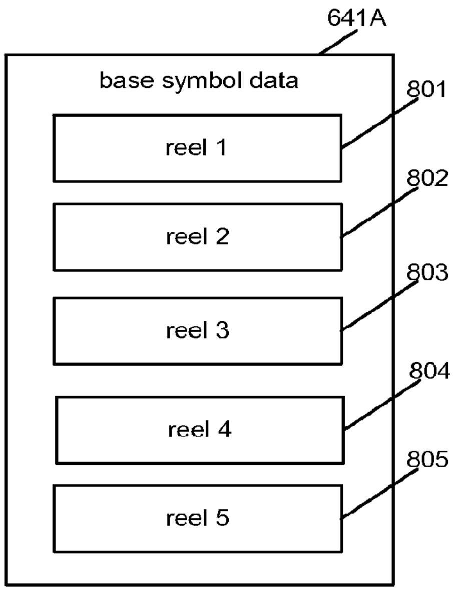
FIG. 8 is an example of main game symbol data.
FIGS. 9A and 9B are exemplary displays of one example.

As illustrated by FIG. 8, one example of selecting symbols is for the base symbol selector 622B to select symbols for display from a plurality of symbol subsets 801,802,803,804,805 of the base symbol data 641A, each symbols corresponding to respective ones of a plurality of spinning reels. The symbol subsets 801,802,803,804,805 can specify a sequence of symbols for each reel such that the base symbol selector 622B can select all of the symbols for display at symbol display positions which may be used in evaluation of the game outcome by selecting a stopping position in the sequence. In one example, three symbols of each of the five reels 801,802,803,804,805 may be displayed such that symbols are displayed at fifteen display positions on display 54. Alternatively, it is known to use a probability table stored in memory 64 to vary the odds of a particular stop position being selected. Other techniques can be used to control the odds of particular outcomes occurring to thereby control the return to player of the game.

Once the symbols have been selected, outcome evaluator 624 evaluates the symbols in light of the win entitlement and the prize table 643 to determine whether to make an award. The outcome evaluator also has a trigger monitor 624 which determines whether a trigger condition 642 has been met, for example three or more scattered symbols being selected for display in the symbol display positions.

In other embodiments, the trigger event may be, an alternative symbol combination in the game, random, occurrence of a specific symbol in the game, purchased, be caused by another connected system, based on turnover etc.

Once the trigger monitor 624A determines that the trigger condition 642 has been met, it activates the feature game controller 625. In the embodiment, the bonus reel 641D is only added during a feature game comprised of a plurality of free game rounds. Accordingly, the functions of the feature game controller 625 are to ensure that the requisite number of free game rounds are carried out and also to control the position of the bonus reel specified by bonus symbol set data 641B in each game round. In one example, the symbol position designator 625A of the feature game controller 625 controls the position to be the same for each game round. In other examples, the bonus reel may move randomly, in accordance with the designated pattern, in accordance with random displacement from the current position etc. In other embodiments, if a further trigger condition is determined by the trigger monitor 624A in any one of the game rounds, a further bonus reel may be added. The further bonus reel may be the same or different to the first bonus reel. The bonus reel symbols may be selected independently whether from the same reel or different reels or, in alternative embodiments, the bonus symbols selection may be interrelated.

In one embodiment, the symbol position designator 625A selects the position based on the bonus symbol position data 644.

Accordingly, it will be appreciated that in this example, the initial position of the bonus reel is prescribed, for example the centre position on the centre reel corresponding to the symbol data. In another embodiment, the initial position may some how be related to the trigger condition, for example if the trigger is caused by a specific symbol, the bonus reel it may replace that symbol. Bonus symbol position data 644 may also specify the manner in which the bonus reel is to move.

In each free game, the bonus symbol selector 622C selects the symbol from the bonus symbol set data 641 to appear at the designated symbol display position as designated by the symbol position as designated by the symbol position designator 625A. The other symbol display positions are populated by the base symbol selector 622B selecting symbols from the base symbol set data 641A. In each free game round, the outcome evaluator 622 evaluates the displayed symbols and determines whether to make an award. The awards are accumulated on the win meter of meter data 645 until the end of the free game series. At the end of the free game series, the accumulated awards on the win meter are transferred to the credit meter. The end of the game may be defined by when the player chooses to cash out or chooses to play another game. In some embodiments, the player may have the opportunity to gamble the amount which has been awarded.

Accordingly, it will appreciated that the method involves receiving 705 a wager and conducting 710 a base game. When the base game is conducted the outcome evaluator monitors for whether there is a trigger 715 and if there is no trigger the main base game is concluded as described above. If there is a trigger, a free game feature is started 720 and a count of the number of free games N is set, for example at 10 games for 3 scatter symbols and 15 games for 4 scatter symbols.

The position for the bonus symbol is designated 730 and the method then involves selecting the bonus symbol for the bonus symbol positions 735 while selecting base symbols for other symbol positions 740. In one example, this is achieved by showing five reels as spinning with an overlay of the bonus symbol reel spinning within a symbol position of one of the reels. Once each of the reels has been stopped (including the bonus reel) the outcome evaluator evaluates 745 the displayed symbols. The count of free game rounds is then decreased 750 (this could occur at other points in the procedure). It is then determined 755 whether the count has reached zero (i.e. the end of the free games) if so the game controller reverts to waiting to receive a further wager 705 or a cash out signed. If the counter has not reached zero the method also involves determining whether a further trigger 760 occurs within the symbols and adding a symbol display position to be designated 765 upon a further trigger occurring. The next stage in the process 700 is designating 730 a position for the bonus symbol depending on the game rules such that a position will be designated for each bonus reel.

A person skilled in the art will appreciate that there may be a number of variations for example the position the bonus reel may be dependent on something occurring in a game outcome, alternatively, the feature game may be started before the bonus reel appears. For example, a bonus reel may be added each time a "bonus" symbol or the like is displayed.

The symbols contained in the bonus reel may be derived from the existing symbols of the game or be symbols which are specific to the bonus reel or a mixture of both. The symbols may enhance particular outcomes or increase the possibility of outcomes occurring. Various other variations will be apparent to persons skilled in the art.

Example

In the example, a Reel Power game (of the general type described above) is provided where the rules of the game state that any three scatter symbols would trigger 10 free games with a bonus reel initially placed on the centre position of the third reel of 5 reels. This configuration is shown in FIG. 9A where a first game display 901 is shown with three symbols from each reel with a wild symbol 902 having been selected for the bonus reel. In the example, a bonus reel is indicated by the shaded background of a symbol display position. The bonus reel will persist in its position for each game round until the free games are exhausted. During the free rounds if the "bonus" symbol 903 is spun up as shown in FIG. 9A, a further bonus reel is added in the subsequent game round. Accordingly, FIG. 9A shows the situation at the end of the first game round where the bonus reel located in the centred position of reel 3, 902, has been spun and wild symbol has been selected. This bonus reel will persist for the entirety of the free game series. A bonus symbol has been spun up at the bottom position of the fourth reel 903. Referring now to FIG. 9B, a further bonus reel 913 has been added at the bottom of the fourth reel. FIG. 9B also shows that a wild symbol has been selected at the bottom of the fourth reel at a position corresponding to where the bonus symbol was spun up on the previous game round shown in FIG. 9A. Further on the sticky bonus reel 912 shown previously in FIG. 1, a different symbol has been spun up in the form of the symbol "PIC 1".

As the game is a reel power game and the player is playing all reels, 5 of a kind PIC 1 will be paid for the arrangement shown in FIG. 9A whereas in FIG. 9B a four of a kind ace (A) win will be paid because there are aces on each of the first three reels and a wild symbol on the fourth reel.

A game round involves at least one of the reels being "spun"—e.g. new symbols of the reels are selected for display at the display positions and the reel is either physically or virtually spun to a stop. Persons skilled in the art will appreciate that there may be more than one game round in a play of a gaming machine such as is the case when a series of free spins is awarded. The outcome of a game round may be no win, a win (for example from a winning combination of symbols), a contribution towards a win accrued over a plurality of game rounds, a trigger condition occurring etc.

In some embodiments, an eligibility criteria may be applied in order for a player to be eligible for the feature game, for example that the player has made a certain sized wager, made an ante bet, selected all win lines, played sufficient games, or the player is a member of a loyalty program.

Further aspects of the method will be apparent from the above description of the gaming system. Persons skilled in the art will also appreciate that the method could be embodied in program code. The program code could be supplied in a number of ways, for example on a computer readable storage medium, such as a disc or a memory (for example, that could replace part of memory 103) or as a data signal (for example, by transmitting it from a server).

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of gaming for use with a gaming machine having a credit input mechanism configured to receive a physical item representing a monetary value for establishing a credit balance, the credit balance being increasable and decreasable based at least on wagering activity, a display having a plurality of display positions, a payout mechanism configured to cause a payout associated with the credit balance, an electronic gaming controller, and a memory having a) a base symbol set including a plurality of base symbols, b) a bonus symbol set having a plurality of bonus symbols, and c) a designated pattern including a plurality of predetermined display positions of the plurality of display positions, the method comprising:

establishing a credit balance via said credit input mechanism receiving the physical item;

in accord with the established credit balance, selecting in a game round via the electronic gaming controller, symbols for display from the base symbol set;

displaying at the plurality of display positions the selected symbols;

determining in the game round, via the electronic gaming controller, an occurrence of a trigger condition;

designating in response to the occurrence of the trigger condition, via the electronic gaming controller, a first display position of the predetermined display positions of the designated pattern;

selecting in a subsequent game round, via the electronic gaming controller, a bonus symbol from the bonus symbol set for display at the display positions corresponding to the designated first display position and selecting symbols for display from the base symbol set at the plurality of display positions except at the designated first display position;

displaying, via the electronic gaming controller, on the display in the subsequent game round a) the selected bonus symbol at the display position corresponding to the designated first display position and b) the selected symbols from the base symbol set at the plurality of display positions except at the display position corresponding to the designated first display position;

evaluating in the subsequent game round, via the electronic gaming controller, the selected symbols at the plurality of symbol display position to determine whether to make an award for the game round; and providing via the payout mechanism the award.

2. A method of claim 1, wherein the plurality of symbol display positions are arranged in a plurality of columns, each column comprising a plurality of symbol display positions.

3. A method as claimed in claim 2, wherein the base symbol set comprises a plurality of symbol subsets corresponding to respective ones of the plurality of columns such that each designated symbol display position corresponds to one of the symbol sets.

4. A method as claimed in claim 1, wherein the position of the designated symbol display position is predetermined.

5. A method as claimed in claim 1, comprising selecting the position of the designated symbol display position at random.

6. A method as claimed in claim 1, wherein the game round is one of a series of game rounds in which a symbol is selected for display at a designated symbol display position.

7. A method as claimed in claim 6, wherein the designated symbol display position is different in different ones of the game rounds.

8. A method as claimed in claim 7, comprising moving the designated symbol display position between symbol display positions in accordance with a designated pattern of movement.

9. A method as claimed in claim 8, comprising moving the designated symbol display position between symbol display positions in accordance with a random displacement relative to a prior designated symbol display position.

10. A game controller for a gaming machine having a credit input mechanism configured to receive a physical item representing a monetary value for establishing a credit balance, the credit balance being increasable and decreasable based at least on wagering activity, a display having a plurality of display positions, a payout mechanism configured to cause a payout associated with the credit balance, an electronic gaming controller, and a memory having a) a base symbol set including a plurality of base symbols, b) a bonus symbol set having a plurality of bonus symbols, and c) a designated pattern including a plurality of predetermined display positions of the plurality of display positions, the game controller comprising:

a base symbol selector configured to, in accord with a credit balance established via said credit input mechanism receiving the physical item, select symbols for display at each of the plurality of symbol display positions from the base symbol set, and to cause the display to display at the plurality of display positions the selected symbols;

an outcome evaluator configured to determined in the round an occurrence of a trigger condition;

a symbol position designator configured to, in response to the occurrence of the trigger condition, designate a first display position of the predetermined display positions of the designated pattern;

a bonus symbol selector in a subsequent game round configured to select a bonus symbol from the bonus symbol set for display at the display position corresponding to the designated first display position, and wherein the base symbol selector is further configured to select symbols for display from the base symbol set at the plurality of display positions except at the designated first display position; and wherein the outcome evaluator is further configured to evaluate in the subsequent game round the selected symbols at the plurality of symbol display positions to determine whether to make an award for the game round, and causes the payout mechanism to provide the award.

11. A game controller as claimed in claim 10, wherein the symbol display positions are arranged in a plurality of columns, each column comprising a plurality of symbol display positions and the base symbol set comprises a plurality of symbol subsets corresponding to respective ones of a plurality of columns such that each designated symbol display position corresponds to one of the symbol sets.

12. A game controller as claimed in claim 10, wherein the position of the designated symbol display position is predetermined.

13. A game controller as claimed in claim 10, wherein the symbol position designator comprising selecting the position of the designated symbol display position at random.

14. A game controller as claimed in claim 10, wherein the game round is one of a series of game rounds conducted by the game controller in which a symbol is selected by the bonus symbol selector from a bonus symbols set for display at a designated symbol display position.

15. A game controller as claimed in claim 14, wherein the symbol position designator designates a different symbol display position in different ones of the game rounds.

16. A game controller as claimed in claim 15, wherein the symbol position designator moves the designated symbol display position between symbol display positions in accordance with a designated pattern of movement.

17. A game controller as claimed in claim 16, wherein the symbol position designator moves the designated symbol display position between symbol display positions in accordance with a random displacement relative to a prior designated symbol display position.

18. A game controller as claimed in claim 16, wherein the symbol position designator selects the designated symbol display position at random for at least one subsequent game round of the series of game rounds.

19. A gaming machine comprising:

a credit input mechanism configured to receive a physical item representing a monetary value for establishing a credit balance, the credit balance being increasable and decreasable based at least on wagering activity;

a display configured to display play of a game and having a plurality of display positions;

a game play mechanism configured to initiate play of the game;

a memory having a) a base symbol set including a plurality of base symbols, b) a bonus symbol set having a plurality of bonus symbols, and c) a designated pattern including a plurality of predetermined display positions of the plurality of display positions; and a game controller operably connected to the display and the game play mechanism, and configured to in accord with the established credit balance:

select in a game round symbols for display from the base symbol set, cause the display to display at the plurality of display positions the selected symbols, determined in the game round an occurrence of trigger condition, designated in response to the occurrence of the trigger condition a first display position of the predetermined display positions of the designated pattern, select and display in a subsequent game round a bonus symbol from the bonus symbol set for display at the display position corresponding to the designated first display position, and select and display symbols from the base symbol set at the plurality of display positions except at the designated first display position; and evaluate in the subsequent game round the selected symbols at the plurality of symbol display positions to determine whether to make an award for the game round a payout mechanism configured to cause a payout associated with the credit balance.

20. A gaming system as claimed in claim 19, wherein the plurality of symbol display positions are arranged in a plurality of columns on the display, each column comprising a plurality of symbol display positions.

* * * * *